Figure 1:
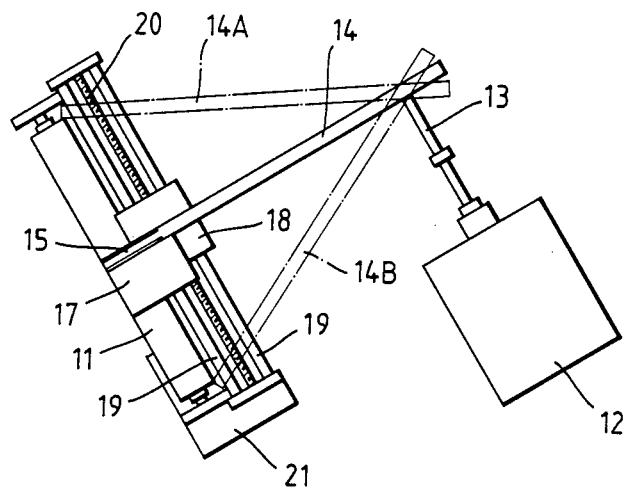

United States Patent [19]

Perkins

[11] Patent Number: 4,871,409
[45] Date of Patent: Oct. 3, 1989

[54] APPARATUS FOR LAYING A CONTINUOUS STRIP OF ELASTOMERIC MATERIAL ONTO A SURFACE

[75] Inventor: David J. B. Perkins, Woolton, United Kingdom

[73] Assignee: Apsley Metals Limited, United Kingdom

[21] Appl. No.: 116,780

[22] Filed: Nov. 5, 1987

[30] Foreign Application Priority Data

Nov. 18, 1986 [GB] United Kingdom ............... 8627503

[51] Int. Cl.$^4$ ............... B29D 7/14; B65H 81/00
[52] U.S. Cl. ................... 156/110.1; 156/195; 156/244.11; 156/244.13; 156/361; 156/405.1; 156/425; 156/500
[58] Field of Search ............. 156/130, 405.1, 397, 156/184, 195, 189, 443, 446, 425, 110.1, 244.11, 244.13, 500, 406.4, 510, 361; 425/363, 366, 337

[56] References Cited

U.S. PATENT DOCUMENTS

| | | |
|---|---|---|
| 3,126,306 | 3/1964 | Sherman. |
| 3,418,191 | 12/1968 | Dieckmann et al. ............... 156/397 |
| 3,716,442 | 2/1973 | Hineline. |
| 4,010,054 | 3/1977 | Bradt .................... 156/195 X |
| 4,043,731 | 8/1977 | Kratzmann et al. ............ 425/366 |
| 4,098,095 | 7/1978 | Roth ........................ 425/363 X |

FOREIGN PATENT DOCUMENTS

| | | |
|---|---|---|
| 2162864 | 6/1973 | Fed. Rep. of Germany. |
| 960488 | 6/1964 | United Kingdom. |
| 2132573 | 7/1984 | United Kingdom. |

OTHER PUBLICATIONS

European Search Report.

*Primary Examiner*—David Simmons
*Attorney, Agent, or Firm*—Stevens, Davis, Miller & Mosher

[57] ABSTRACT

An apparatus for laying a continuous helically wound strip (30) of elastomeric material around a mandrel (11) to form a cylindrical ply thereon. The apparatus comprises a head unit (17) mounted on a carriage (18) for movement during the laying of the strip. The head unit (17) has a body (22) with a pair of calender rolls (24) (25) thereon to receive the strip (30) and produce therefrom a strip of uniform thickness. A support means (28) is pivoted to the body (22) and has an application roller (27) thereon that receives the calendared strip and lays the strip ont the mandrel. The application roller is arranged to exert a light load on the strip as it is wound onto the mandrel.

14 Claims, 2 Drawing Sheets

APPARATUS FOR LAYING A CONTINUOUS STRIP OF ELASTOMERIC MATERIAL ONTO A SURFACE

This invention relates to an apparatus for laying a continuous strip of elastomeric material onto a surface, and in particular for laying a continuous helically wound strip of elastomeric material onto a mandrel to form a cylindrical ply thereon.

It is known during the manufacture of reinforced elastomeric plies to form a layer of elastomeric material by helically winding a thin strip of elastomeric material along a mandrel to produce a cylindrical layer of elastomeric material. Such a process is described in British Pat. No. 2132573. The elastomeric layer may then be reinforced by winding cord or filament onto the elastomeric layer. The reinforced ply so formed may be suitable for the subsequent manufacture of a pneumatic tire.

The present invention provides apparatus for accurately laying the elastomeric strip.

Accordingly there is provided an apparatus suitable for laying a continuous helically wound strip of elastomeric material onto a mandrel to form a cylindrical ply thereon and which comprises a head unit mounted on a carriage for movement during laying of the strip, and a body, a pair of driven calender rolls mounted on the body to receive an extrudate strip and produce therefrom a calendered strip of uniform thickness, a support means pivoted to the body for receiving the calendered strip and laying the strip onto a surface, and an application roller mounted on the support means.

Also according to this invention there is provided a method of manufacturing a play of elastomeric material for a pneumatic tire in which a cylindrical layer of elastomeric material is formed by helically winding a strip of elastomeric material along a mandrel and including the steps of:
   a. producing an extrudate strip,
   b. passing the extrudate strip through a calender to form a calendered strip of uniform thickness,
   c. causing the calender to move axially of the mandrel as the mandrel is rotated to lay the strip onto the mandrel,
   d. exerting a light load on the strip as it is wound onto the mandrel surface, and
   e. severing the strip when the wound layer is complete.

Figure 2:
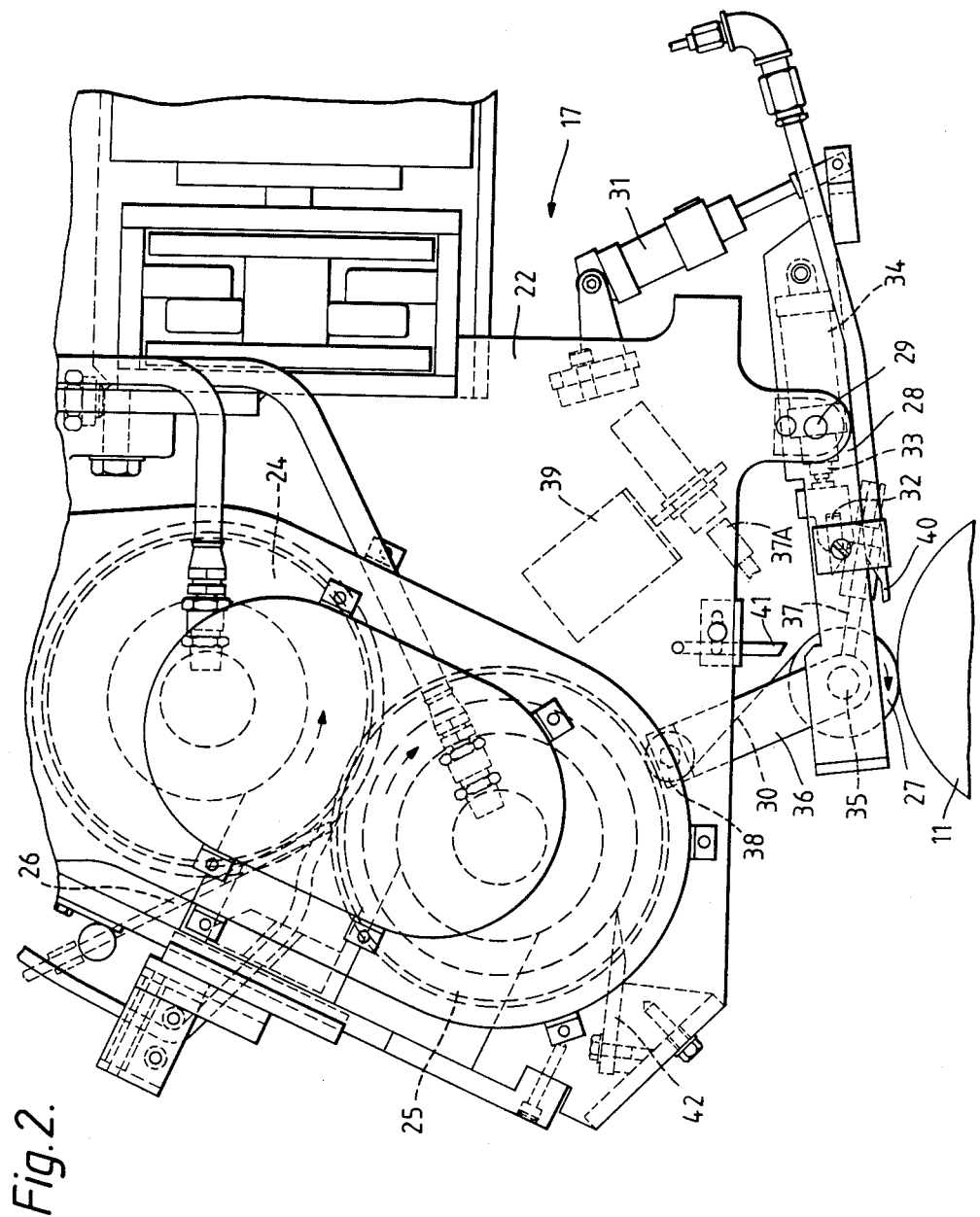

The apparatus will be described by way of example and with reference to the accompanying drawings in which:

FIG. 1 is a schematic diagram of a machine suitable for winding a continuous strip of elastomeric material on a mandrel and which incorporates apparatus according to this invention, and FIG. 2 is a detailed elevation of apparatus according to this invention.

With reference to FIG. 1 of the drawings, a mandrel 11 is shown at a station which is designed for the application of a first rubber layer to the mandrel. For this purpose an extruder 12 is arranged to deliver a circular cross-section rubber extrudate approximately 6 millimetres in diameter onto a short gravity conveyor 13 and thence to a telescopic belt conveyor 14. Alternatively the extrudate can be dropped into a festoon device which acts to control the speed of the extruder to match usuage of the extrudate. The extrudate then passes from the festoon to the conveyor 14. The conveyor 14 is arranged to pivot in a horizontal plane about an axis aligned with the point at which it received the extruded strip, the extreme positions 14A, 14B of the conveyor 14 being indicated in dotted lines of FIG. 1. The delivery end 15 of the conveyor 14 fees the rubber extrudate to a laying head unit 17 mounted on a carriage 18 arranged to traverse on a guide bars 19 in a direction parallel to the axis of the mandrel. The guide bars 19 may be part of a H-section bar on which the carriage 18 is mounted by means of rollers. The carriage 18 is driven by a lead screw (or other traversing mechanism) 20 which is itself rotatable by a common drive unit 21 for both the mandrel 11 and the lead screw, and which is fixed at a ratio of 1:1. The movement of the carriage and the rotation speed of the mandrel provide a helical butt-wound layer of rubber on the mandrel, and this is suitably regulated by varying the pitch of the lead screw and/or varying the tension of the strip between the calender and mandrel.

The laying head unit 17 is illustrated in more detail in FIG. 2, and comprises a body 22 supporting a pair of driven calender rolls 24 and 25 which receive the extrudate form the end of the belt conveyor 14, perhaps via an intermediate roller. The extrudate is guided onto the calender rolls 24 and 25 via a pair of rods 26 which hold the extrudate central in the nip of the calender rolls. The extrudate passes through the nip between the rolls 24 and 25 which ensures that the emerging strip 30, two centimetres in width, is of uniform thickness as it is fed to the mandrel 11 under a lightly loaded application roller 27. The calender rolls 24 and 25 are described in detail in British Patent Application No. 2132573.

The roller 27 exerts a load of about 500 gm (1 lb) onto the calendered strip 30. The roller 27 is caused to rotate by its abutment against the mandrel 11 and is carried on one end of a support arm 28 which is supported on the body 22 by a pivot 29 located at the mid-portion of the arm 28. The other end of the arm 28 is connected to an actuator 31, operable when the carriage 8 reaches the end of its travel along the mandrel 11 to lift the roller 27 off the mandrel 11. The actuator 31 also biases the arm 28 to exert the application load on the roller 27. The arm 28 supports a knife 32 located within the arm and which is carried on the shaft 33 of the second actuator 34 and is operable to sever the extruded strip 30 when the layer on the mandrel is complete.

The roller 27 is caused to rotate by its contact with the power driven mandrel and is arranged to rotate in one direction only (clockwise as shown) so as to prevent shrinkage of the calendered strip 30 when the calender rolls 24 and 25, and the mandrel 11 are stopped, and the strip 30 is stationary.

A take-up roller 38 is supported at one end of a take-up arm 36 which is pivoted at its other end to the support arm 28, preferably coaxially with the axle 35 of the application roller 27. The calendered strip 30 passes anticlockwise around the take-up roller 38 so that the take-up arm 36 can pivot in an anticlockwise direction so as to move the roller 38 to take up any excess length of strip 30 between the calender rolls 24 and 25 and the application roller. Said other end of the take-up arm 36 is fixedly attached to a sensor arm 37 which is moveable to the position 37A (shown in dotted lines) as the take-up arm rotates to take up excessive extrudate strip. At the position 37A the sensor arm 37 triggers an electrical sensor 39 to switch off power to the calender rolls 24 and 25 to prevent production of excess strip 30.

A pair of air jets 40 and 41 are directed onto the application roller 27 from substantially perpendicualar directions to hold the calendered strip onto the roller surface.

A scraper blade 42 is located adjacent the calender roller 25 clockwise around from the take-off roller 38, to prevent adhered strip from feeding back into the nip area between the calender rollers 24 and 25. This acts as an aid to feeding of the strip 30 to the application roller 27 on initial start-up of the head laying unit 17.

After completion of the winding of the rubber layer and the severing of the strip 30, the mandrel 11 is indexed around. This brings the end portion of the severed strip already wound onto the mandrel, into contact with the wound elastomeric layer, into which the end portion is then pressed by the application roller 27. Also the end portion of the calender strip 30 is brought around the application roller to the contact point on the roller ready for the next cycle of the strip winding operation.

I claim:

1. Apparatus suitable for laying a continuous helically wound strip of elastomeric material onto a mandrel to form a cylindrical ply thereon and which comprises:
   a head unit mounted on a carriage for movement during laying of the strip;
   said head unit having a body;
   a pair of calender rolls mounted on the body to receive an extrudate strip and produce therefrom a calendered strip of uniform thickness;
   a support means pivoted to the body;
   an application roller mounted on the support means for receiving the calendered strip and laying the strip onto a surface;
   a take-up arm which is pivoted at one end thereof to the support means and a take-up roller, the calendered strip being arranged to pass around the take-up roller before passing to the application roller, the take-up arm being free to pivot to take-up excess length of calendered strip between the calender rolls and the application roller.

2. Apparatus as claimed in claim 1, wherein the take-up arm is mounted to pivot about the axis of the application roller.

3. Apparatus as claimed in claim 1 in which the head unit has guide means to hold the extrudate central in the nip of the calender rolls.

4. Apparatus suitable for laying a continuous helically wound strip of elastomeric material onto a mandrel to form a cylindrical ply thereon and which comprises:
   a head unit mounted on a carriage for movement during laying of the strip, and having a body;
   a pair of driven calender rolls mounted on the body to receive an extrudate strip and produce therefrom a calendered strip of uniform thickness;
   a support means pivoted to the body;
   an application roller mounted on the support means for receiving the calendered strip and laying the strip onto a surface;
   said head unit having air jet means which operate to hold the calender strip on the application roller.

5. Apparatus as claimed in claim 1 wherein the take-up arm has at its end portion adjacent the support means a sensor arm which is attached to the take-up arm, and sensor means responsive to movement of the take-up arm to stop the calender rolls if the length of calendered strip passing around the take-up roller exceeds a predetermined limit.

6. Apparatus suitable for laying a continuous helically wound strip of elastomeric material onto a mandrel to form a cylindrical ply thereon and which comprises:
   a head unit mounted on a carriage for movement during laying of the strip, and having a body;
   a pair of driven calender rolls mounted on the body to receive an extrudate strip and produce therefrom a calendered strip of uniform thickness;
   a support means pivoted to the body, and having an application roller mounted on the support means for receiving the calendered strip and laying the strip onto a surface;
   a knife means mounted on the support means to sever the calendered strip on termination of laying of the strip.

7. Apparatus as claimed in claim 6 in which the head unit has guide means to hold the extrudate central in the nip of the calender rolls.

8. Apparatus as claimed in claim 6 in which the head unit has air jet means which operate to hold the calender strip on the application roller.

9. Apparatus suitable for laying a continuous helically wound strip of elastomeric material onto a mandrel to form a cylindrical ply thereon and which compriese:
   a head unit mounted on a carriage for movement during laying of the strip, and having a body;
   a pair of driven calender rolls mounted on the body to receive an extrudate strip and produce therefrom a calendered strip of uniform thickenss;
   a support means pivoted to the body; an application roller mounted on the support means for receiving the calendered strip and laying the strip onto a surface;
   said application roller including means that allows the roller to rotate in one direction only in contact with said mandrel to minimize shrinkage in the calendered strip when the calendered strip is stationary.

10. Apparatus as claimed in claim 1 including a means adjacent the surface of one of the calender rolls to prevent extrudate strip from feeding around said one calender roll back into the nip between the two calender rolls.

11. A method of manufacturing a ply of elastomeric material for a pneumatic tire in which a cylindrical layer of elastomeric material is formed by helically winding a strip of elastomeric material along a mandrel, and including the steps of:
   (a) producing an extrudate strip;
   (b) passing the extrudate strip through a calender to form a calendered strip of uniform thickness;
   (c) passing said calendered strip around an application roller, said strip being held onto the application roller by air jet means;
   (d) causing the calender and application roller to move axially of the mandrel as the mandrel is rotated to lay the calendered strip on the mandrel;
   (e) exerting a light load on the calendered strip by means of the application roller, as said strip is wound onto the mandrel surface;
   (f) severing the strip when the wound layer is complete.

12. A method of manufacturing a ply of elastomeric material for a pneumatic tire in which a cylindrical layer of elastomeric material is formed by helically winding a strip of elastomeric material along a mandrel, and including the steps of:
   (a) producing an extrudate strip;

(b) passing the extrudate strip through a calender to form a calendered strip of uniform thickness;
(c) passing said calendered strip around an application roller;
(d) passing the calendered strip around a take-up means between the calender and the application roller to take-up excess length of calendered strip between said calender and said application roller, said take-up means being operable to stop the calender if the length of calendered strip passing around the take-up means exceeds a predetermined limit;
(e) causing the calender, application roller, and take-up means to move axially of the mandrel as the mandrel is rotated to lay the strip onto the mandrel;
(f) exerting a light load on the calendered strip by means of the application roller as said strip is wound onto the mandrel surface; and
(g) severing the strip when the wound layer is complete.

13. A method of manufacturing a ply of elastomeric material for a pneumatic tire in which a cylindrical layer of elastomeric material is formed by helically winding a strip of elastomeric material along a mandrel, and including the steps of:
(a) producing an extrudate strip;
(b) passing the extrudate strip through a calender to form a calendered strip of uniform thickness;
(c) passing said calendered strip around an application roller;
(d) causing the calender and application roller to move axially of the mandrel as the mandrel is rotated to lay the strip onto the mandrel;
(e) exerting a light load on the strip by means of the application roller as it is wound onto the mandrel surface;
(f) severing the strip when the wound layer is complete, and
(g) causing the mandrel to further rotate after severance of the strip to wind the severed end portion of the strip on the mandrel into contact with the wound ply on the mandrel, said severed end portion being pressed into the ply by the application roller, and the other severed end portion of the calendered strip from the calender being brought around the application roller by the futher rotation of the mandrel into contact with the mandrel for the next cycle of the strip winding operation.

14. A method of manufacturing a ply of elastomeric material for a pneumatic tire in which a cylindrical layer of elastomeric material is formed by helically winding a strip of elastomeric material along a mandrel, and including the steps of:
(a) producing an extrudate strip;
(b) passing the extrudate strip through a calender to form a calendered strip of uniform thickness;
(c) passing said calendered strip around an application roller, said roller being rotatable in one direction only to lay the strip onto the mandrel, and prevent shrinkage of the calendered strip when said strip is stationary;
(d) causing the calender and application roller to move axially of the mandrel as the mandrel is rotated to lay the calendered strip on the mandrel;
(e) exerting a light load on the calendered strip by means of the application roller as said strip is wound onto the mandrel surface; and
(f) severing the strip when the wound layer is complete.

* * * * *